US 12,497,916 B2

United States Patent
Deutscher et al.

(10) Patent No.: US 12,497,916 B2
(45) Date of Patent: Dec. 16, 2025

(54) ELECTRICALLY ASSISTED TURBOCHARGER, DRIVE UNIT HAVING AN ELECTRICALLY ASSISTED TURBOCHARGER, AND METHOD FOR AN ELECTRICALLY ASSISTED TURBOCHARGER

(71) Applicant: IHI Corporation, Tokyo (JP)

(72) Inventors: Matthias Deutscher, Haßloch (DE); Nestor Kaspschik, Baden (AT); Martin Rode, Waldbrunn (DE); Nicolai Schmock, Oberschwarzach (DE)

( * ) Notice: Subject to any disclaimer, the term of this patent is extended or adjusted under 35 U.S.C. 154(b) by 0 days.

(21) Appl. No.: 18/697,843

(22) PCT Filed: Oct. 4, 2022

(86) PCT No.: PCT/DE2022/100736
§ 371 (c)(1),
(2) Date: Apr. 2, 2024

(87) PCT Pub. No.: WO2023/061531
PCT Pub. Date: Apr. 20, 2023

(65) Prior Publication Data
US 2025/0003364 A1    Jan. 2, 2025

(30) Foreign Application Priority Data
Oct. 12, 2021   (DE) .................. 10 2021 126 406.5

(51) Int. Cl.
*F02B 37/10* (2006.01)
*F02B 29/04* (2006.01)
*F02B 39/10* (2006.01)

(52) U.S. Cl.
CPC .......... *F02B 37/10* (2013.01); *F02B 29/0456* (2013.01); *F02B 39/10* (2013.01)

(58) Field of Classification Search
CPC .. F02B 37/10; F02B 29/0406; F02B 29/0456; F02B 39/005; F02B 39/10
See application file for complete search history.

(56) References Cited

U.S. PATENT DOCUMENTS

| 6,032,466 | A | 3/2000 | Woollenweber et al. |
| 6,609,375 | B2 * | 8/2003 | Allen ...................... F01D 15/10 60/607 |

(Continued)

FOREIGN PATENT DOCUMENTS

| DE | 10156704 A1 | 5/2003 |
| DE | 112013005022 | 7/2015 |

(Continued)

*Primary Examiner* — Loren C Edwards
(74) *Attorney, Agent, or Firm* — SHIPWAY IP

(57) ABSTRACT

An electrically assisted exhaust gas turbocharger has a fresh air-conducting section, an exhaust gas-conducting section and a bearing section. A rotating assembly includes a shaft and a compressor wheel connected to the shaft. A turbine wheel is connected to the shaft for conjoint rotation. The compressor wheel is rotatably accommodated in the fresh air-conducting section and the turbine wheel is rotatably accommodated in the exhaust gas-conducting section. The shaft is rotatably mounted in the bearing section and has an electric motor with a rotor and a stator. The rotor is arranged in operative connection with the shaft. A coolant channel in the electrically assisted exhaust gas turbocharger is designed for coolant to flow therethrough. The coolant is compressed air downstream of the compressor wheel and can be fed to the compressor wheel downstream and/or upstream thereof. A sealing element is formed between the electric motor and the fresh air-conducting section.

10 Claims, 3 Drawing Sheets

(56) References Cited

U.S. PATENT DOCUMENTS

| | | | |
|---|---|---|---|
| 7,360,361 B2 | 4/2008 | Prusinski et al. | |
| 2003/0051475 A1* | 3/2003 | Allen | F02B 39/005 60/608 |
| 2009/0056681 A1 | 3/2009 | Shibui et al. | |
| 2010/0284824 A1* | 11/2010 | Hippen | F02C 6/12 415/110 |
| 2015/0285263 A1* | 10/2015 | Bucking | F02C 6/12 415/116 |
| 2020/0256343 A1 | 8/2020 | Sakota et al. | |
| 2020/0256344 A1* | 8/2020 | Sakota | F04D 29/057 |

FOREIGN PATENT DOCUMENTS

| | | |
|---|---|---|
| DE | 112018005188 | 6/2020 |
| DE | 112018005240 | 7/2020 |
| JP | 2005069178 A | 3/2005 |
| JP | 2008045405 A | 2/2008 |

* cited by examiner

ELECTRICALLY ASSISTED TURBOCHARGER, DRIVE UNIT HAVING AN ELECTRICALLY ASSISTED TURBOCHARGER, AND METHOD FOR AN ELECTRICALLY ASSISTED TURBOCHARGER

CROSS-REFERENCE TO RELATED APPLICATION

This application is a national stage application, filed under 35 U.S.C. § 371, of International Patent Application PCT/DE2022/100736, filed on Oct. 4, 2022, which claims the benefit of German Patent Application DE 10 2021 126 406.5, filed on Oct. 12, 2021.

TECHNICAL FIELD

The disclosure relates to an electrically assisted exhaust gas turbocharger, a drive unit having an electrically assisted exhaust gas turbocharger, and to a method for an electrically assisted exhaust gas turbocharger.

BACKGROUND

Electrically assisted exhaust gas turbochargers are known from the prior art. U.S. Pat. No. 7,360,361 B2 discloses an electrically assisted exhaust gas turbocharger, wherein, in order to cool the electric motor, compressed air is guided from a compressor spiral via the electric motor into the oil outlet of the exhaust gas turbocharger, thus giving rise to the risk of an increase of a blowby mass flow.

SUMMARY

The present disclosure provides an improved electrically assisted exhaust gas turbocharger. The disclosure further provides a drive unit having an electrically assisted exhaust gas turbocharger and a method for an electrically assisted exhaust gas turbocharger.

The disclosure relates to an electrically assisted exhaust gas turbocharger which has a fresh air-conducting section, an exhaust gas-conducting section and a bearing section. Furthermore, the electrically assisted exhaust gas turbocharger has a rotating assembly comprising a shaft and a compressor wheel which is connected to the shaft for conjoint rotation therewith, as well as a turbine wheel which is connected to the shaft for conjoint rotation therewith. The compressor wheel is rotatably accommodated in the fresh air-conducting section and the turbine wheel is rotatably accommodated in the exhaust gas-conducting section. The shaft is rotatably mounted in the bearing section. Furthermore, the electrically assisted exhaust gas turbocharger has an electric motor, wherein the electric motor has at least a rotor and a stator, wherein the rotor is arranged in operative connection with the shaft. The electrically assisted exhaust gas turbocharger has a coolant channel in order to cool the electric motor, wherein the coolant channel is designed for coolant to flow therethrough, wherein the coolant is compressed air downstream of the compressor wheel and can be fed to the compressor wheel downstream and/or upstream thereof, and wherein a sealing element is formed opposite the stator in the axial direction between the electric motor and the fresh air-conducting section. That is to say in other words that recirculation of compressed air from the fresh air-conducting section is designed to cool the electric motor, wherein the air is then fed behind the compressor wheel, i.e. via the wheel back thereof, to the air-conducting section. The sealing element is designed in order to avoid ingress of hot air originating from the fresh air-conducting section in the direction of the bearing section. Advantageously, the disclosed design assures improved cooling of the electric machine, since a forced and thus increased cooling mass flow can be fed to the electric motor, can be supplied to the air gap between the rotor and stator.

At this point, it can be mentioned that the term coolant channel is to be understood to be a means, via which the coolant can flow. That is to say that the coolant channel can be a typical channel in the form of a flow bed, but it can also be designed in the form of an air gap.

Preferably, the coolant channel is designed in the form of an air gap located between the rotor and the stator and so preferably the increased air mass flow can be fed to the air gap which is formed between the stator and the rotor and serves as the coolant channel.

Advantageously, an electrically assisted exhaust gas turbocharger has improved efficiency because the air which is compressed downstream of the compressor wheel and is compressed e.g. in the fresh air-conducting section or is fed as compressed air is not simply discharged into the environment but instead is then fed to the fresh air-conducting section. Therefore, it is possible to reduce a thermal loading of the integrated electric motor during active and passive operation, and thereby to enable protection of components in passive operation and also to permit a longer duration of usage of the output electric power in active operation.

In one embodiment of the electrically assisted exhaust gas turbocharger, the coolant channel for the inflow of the coolant is formed on a side of the electric motor facing away from the compressor wheel and the coolant channel for the outflow of the coolant is formed on a side of the electric motor facing the compressor wheel. The advantage is assured guidance of the coolant through the electric motor towards the fresh air-conducting section. In this case, e.g. the coolant channel in the electric motor can be designed in the form of a nozzle or in other words, a cross-section of the coolant channel on the side of the electric motor facing away from the compressor wheel can be larger than a cross-section of the coolant channel on the side of the electric motor facing the compressor wheel.

Advantageously, the coolant is the air compressed in the fresh air-conducting section. Therefore, an electrically assisted exhaust gas turbocharger, which has reduced losses and thus further improved efficiency, is achieved because the air which is drawn in by the compressor wheel and compressed in the fresh air-conducting section is not simply discharged into the environment but instead is then fed to the fresh air-conducting section.

In a further embodiment of the electrically assisted exhaust gas turbocharger, the coolant is guided with the aid of forced guidance through the coolant channel. Therefore, assured cooling of the electric motor is achieved.

Advantageously, the forced guidance includes a pressure difference between a charging pressure formed downstream of the compressor wheel and an inlet pressure formed upstream of the compressor wheel in the fresh air-conducting section. That is to say in other words that a pressure gradient between a diffuser at a wheel outlet of the compressor wheel and a compressor volute outlet or a pressure downstream of a charging air cooler is utilised cost-effectively in an advantageous manner for forced guidance of the coolant, and so e.g. no additional conveying means, e.g. a pump, has to be used for forced guidance of the coolant.

In a further embodiment of the electrically assisted exhaust gas turbocharger, a cover element is formed at least partially between the electric motor and the fresh air-conducting section. Furthermore, the cover element also serves to protect against heat input from the heat generated in the electric motor into the fresh air-conducting section because this could result in a loss of efficiency.

Advantageously, the cover element is designed for water cooling and so water cooling of the electric motor can be provided in addition to air cooling.

In an advantageous manner, the bearing section can be used to produce the coolant channel if the coolant channel is formed at least partially in the bearing section. When the electric motor is arranged between the fresh air-conducting section and the bearing section, this has the particular advantage that the coolant can be easily introduced into the electric motor on the side of the electric motor facing away from the compressor wheel.

In a further embodiment, the coolant channel has a coolant channel inlet in the bearing section or in a housing which is designed to cover the electric motor at least partially.

In a further embodiment, the coolant channel is formed at least partially in the stator.

A second aspect of the disclosure relates to a drive unit having an electrically assisted exhaust gas turbocharger, wherein the electrically assisted exhaust gas turbocharger is designed as disclosed herein, and wherein, in order to produce a first cooling path, an extraction point of the coolant is formed downstream of the compressor wheel and upstream of a charging air cooler of the drive unit and/or, in order to produce a second cooling path, said extraction point of the coolant is formed downstream of the charging air cooler and upstream of the drive unit, wherein a coupling point of the first cooling path to the second cooling path is formed. An advantage of the extraction point behind the charging air cooler is the colder air which provides for improved heat discharge in the rotor air gap.

In one embodiment of the drive unit, a coupling point of the first cooling path to the second cooling path is formed. Therefore, in dependence upon the cooling requirement of the electric motor, a coolant temperature of the coolant can be reached which has a value between a value of the coolant temperature upstream of the charging air cooler and a value of the coolant temperature downstream of the charging air cooler. Advantageously, the value can be set in a regulated manner.

A third aspect of the disclosure relates to a method for an electrically assisted exhaust gas turbocharger, wherein the electrically assisted exhaust gas turbocharger has a fresh air-conducting section, an exhaust gas-conducting section and a bearing section, and has a rotating assembly which has a shaft and a compressor wheel which is connected to the shaft for conjoint rotation therewith as well as a turbine wheel which is connected to the shaft for conjoint rotation therewith, wherein the compressor wheel is rotatably accommodated in the fresh air-conducting section and the turbine wheel is rotatably accommodated in the exhaust gas-conducting section, and wherein the shaft is rotatably mounted in the bearing section, and having an electric motor, comprising at least a rotor and a stator, wherein the rotor is arranged in operative connection with the shaft in order to drive the shaft, wherein, downstream of the compressor wheel, coolant in the form of fresh air, which is compressed in the fresh air-conducting section and has a charging pressure, is fed to the electric motor on a side of the electric motor facing away from the compressor wheel, wherein, with the aid of forced guidance, the coolant is guided between the rotor and the stator and is fed to the compressor wheel downstream and/or upstream. The advantage can be seen in a reduction in the thermal loading of the integrated electric motor during active and passive operation, and thereby to enable protection of components in passive operation and also to permit a longer duration of usage of the output electric power in active operation.

In one advantageous embodiment of the method, the forced guidance is formed at least partially from a pressure gradient, wherein the pressure gradient includes the charging pressure and an inlet pressure formed in the fresh air-conducting section upstream of the compressor wheel, wherein the charging pressure is greater than or at most equal to an inlet pressure in the fresh air-conducting section upstream of the compressor wheel.

In a further embodiment of the method, the forced guidance includes a coolant channel, wherein the coolant channel for the inflow of the coolant has a coolant channel inlet in the bearing section and/or in a housing which is designed to cover the electric motor at least partially.

Further advantages, features and details of the invention will be apparent from the following description of preferred exemplified embodiments and with reference to the drawing. The features and combinations of features mentioned earlier in the description and the features and combinations of features mentioned hereinunder in the description of the figures and/or illustrated in the figures alone can be employed not only in the combination stated in each case but also in other combinations or on their own.

DETAILED DESCRIPTION

Figure 1:
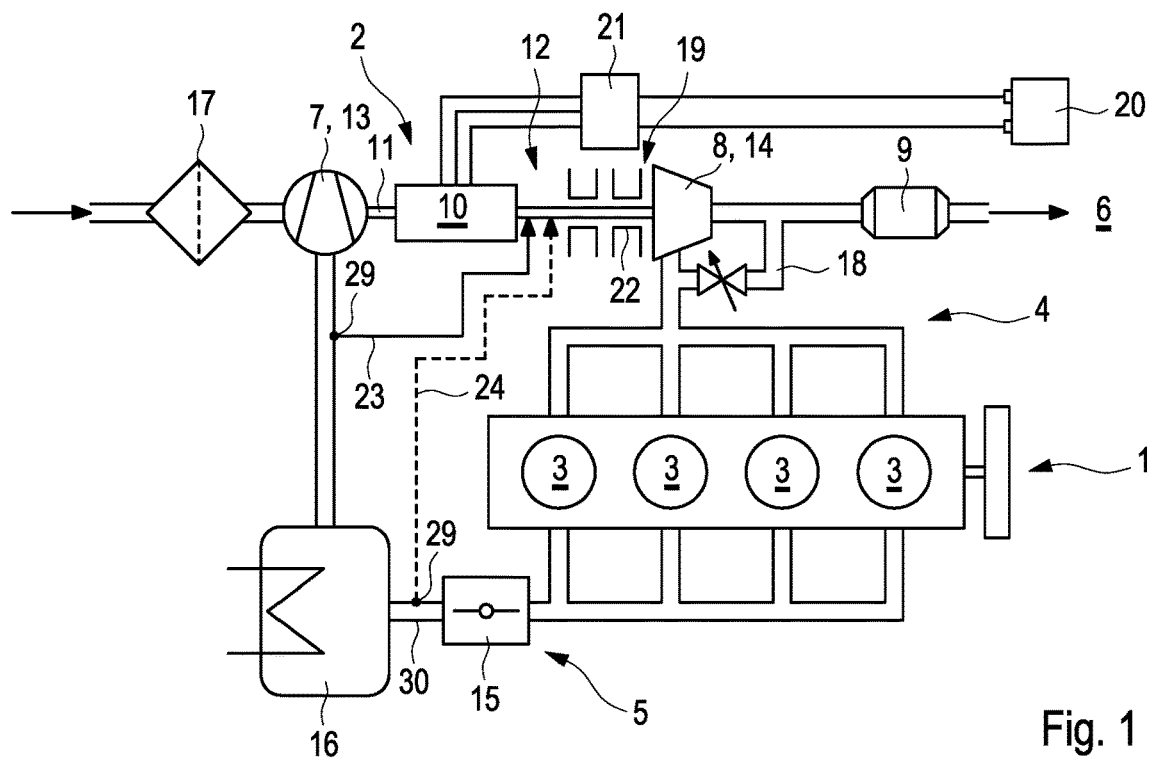
FIG. 1 shows a schematic view of an internal combustion engine having an electrically assisted exhaust gas turbocharger.

A drive unit 1 which, in the present first exemplified embodiment and second exemplified embodiment, is designed in the form of an internal combustion engine 1 is equipped with an electrically assisted exhaust gas turbocharger 2, as illustrated in FIG. 1. The internal combustion engine 1 comprises four cylinders 3, an exhaust gas tract 4 and an intake line 5, wherein a fuel-air mixture which is combusted in the internal combustion engine 1 is transferred in the form of exhaust gas to an environment 6 via the exhaust gas tract 4. It goes without saying that in this case the number of cylinders 3 is variable. The intake line 5 serves to supply fresh air to the internal combustion engine 1. The drive unit 1 could also be designed in the form of a fuel cell.

The electrically assisted exhaust gas turbocharger 2 has a fresh air-conducting section 7, through which a flow can pass, positioned in the intake line 5 of the internal combustion engine 1 and an exhaust gas-conducting section 8, through which a flow can pass and which is arranged in the exhaust gas tract 4 of the internal combustion engine 1. An exhaust gas cleaning unit 9 is formed in the exhaust gas tract 4 downstream of the exhaust gas-conducting section 8.

Arranged between the fresh air-conducting section 7 and the exhaust gas-conducting section 8 is a bearing section 10 of the electrically assisted exhaust gas turbocharger 2 which serves to rotatably mount a shaft 11 of a rotating assembly 12 of the electrically assisted exhaust gas turbocharger 2. The rotating assembly 12 comprises the shaft 11 and a compressor wheel 13 which is connected to the shaft 11 for conjoint rotation therewith and is arranged in the fresh air-conducting section 7, as well as a turbine wheel 14 which is connected to the shaft 11 for conjoint rotation therewith and is arranged in the exhaust gas-conducting section 8.

The fresh air-conducting section 7 is positioned in the intake line 5 upstream of a throttle valve 15, wherein a charging air cooler 16 to cool the charging air compressed by the exhaust gas turbocharger 2 is provided between the fresh air-conducting section 7 and the throttle valve 15. An air filter 17 is arranged in the intake line 5 upstream of the fresh air-conducting section 7.

The exhaust gas-conducting section 8 is designed having a bypass channel 18 to bypass the turbine wheel 14, which is opened in particular in an upper load and/or rotational speed range of the internal combustion engine 1, so that exhaust gas can be directed past the turbine wheel 14. That is to say that the exhaust gas turbocharger 2 of the prior art is designed according to a so-called waste gate charger. The exhaust gas-conducting section 8 could also be designed to accommodate a so-called adjustable guide apparatus which has adjustable guide blades arranged so as to surround the turbine wheel 14.

To ensure that a desired charging air filling can be achieved at all operating points of the internal combustion engine 1, the exhaust gas turbocharger 2 is designed as an electrically assisted exhaust gas turbocharger 2, wherein an electric motor 19 drives the shaft 11. The electric motor 19 can also be designed to feed energy to an energy source 20, e.g. a motor vehicle battery.

During operation of the electric motor 19, the electromagnetic forces between a stator 21 and a rotor 22 cause an increase in temperature of the electric motor 19, wherein components adjacent to the electric motor 19, such as in particular the bearing section 10, likewise have an increase in temperature by reason of heat transfer. The problem is that in the bearing section 10 lubricant is guided which is used for lubricated mounting of the shaft 11. However, heating of the lubricant can lead to damage or even failure of the exhaust gas turbocharger 2. Therefore, cooling of the electric motor 19 is to be provided.

The disclosed design is based upon air cooling of the electric motor 19, wherein, with the aid of the exhaust gas turbocharger 2, compressed air is directed between the stator 21 and the rotor 22 and is then fed to the fresh air-conducting section 7 upstream of a diffuser 27 of the fresh air-conducting section 7. That is to say in other words that a cooling circuit is formed between the fresh air-conducting section 7 and the electric motor 19, wherein compressed air is used as a coolant for cooling purposes.

The electrically assisted exhaust gas turbocharger 2 has the electric motor 19 arranged between the bearing section 10 and the fresh air-conducting section 7, wherein a cover element 25 is formed between the fresh air-conducting section 7 and the electric motor 19 and is arranged in particular to cover a wheel back 26 of the compressor wheel 13 opposite the electric motor 19. The cover element 25 has the further advantage that it can be used to cost-effectively produce a diffuser 27 of the fresh air-conducting section 7 and a spiral channel 28 of the exhaust gas turbocharger 2.

In FIG. 1, the drive unit 1 is illustrated in a first exemplified embodiment with the aid of a solid line, wherein the solid line illustrates a first cooling path 23 of the coolant, wherein the coolant is extracted at an extraction point 29, which is formed upstream of the charging air cooler 16 and downstream of the compressor wheel 13, and is fed to the electric motor 19.

In the case of the first cooling path 23, the extraction point 29 can be formed directly in the fresh air-conducting section 7. In the case of the second cooling path 24, the extraction point 29 is provided in a tube section 30 of the intake line 5 which is arranged between the charging air cooler 16 and the throttle valve 15.

The coolant extracted via the second cooling path 24 has a lower coolant temperature than the coolant extracted via the first cooling path 23 and thus has a greater cooling effect.

Figure 2:
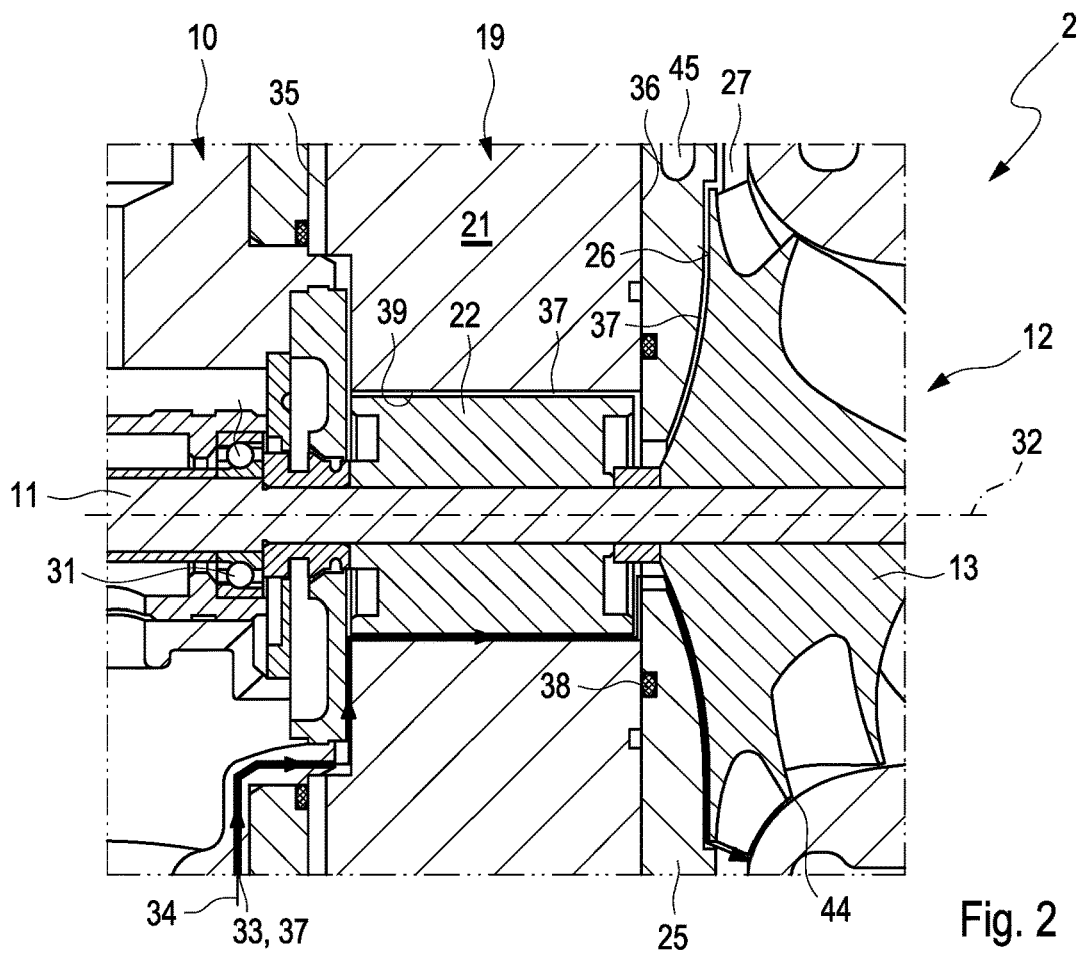
FIG. 2 shows a longitudinal sectional detail of an electrically assisted exhaust gas turbocharger in a first exemplified embodiment.
Figure 3:
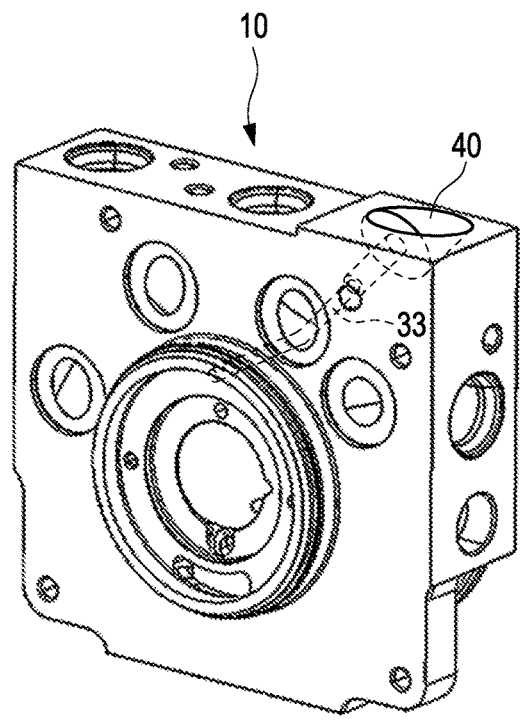
FIG. 3 shows a perspective view of a bearing section of the electrically assisted exhaust gas turbocharger according to FIG. 2.

FIGS. 2 and 3 illustrate the electrically assisted exhaust gas turbocharger 2 or the bearing section 10 of the electrically assisted exhaust gas turbocharger 2 in a first exemplified embodiment. The shaft 11 is rotatably mounted in the bearing section 10 with the aid of a rolling bearing 31. Likewise, a plain bearing or an air bearing could also be provided.

In the present exemplified embodiment, the rotor 22 is connected to the shaft 11 for conjoint rotation therewith, e.g. by shrink-fitting, i.e. in other words it is in operative connection with the shaft 11 and is arranged so as to surround it. During operation of the electric motor 19, the rotor 22 is forced to rotate by reason of magnetic fields formed between the rotor 22 and the stator 21 and, as a result of the operative connection between the rotor 22 and the shaft 11, the shaft 11 is likewise moved so as to rotate about its longitudinal axis 32.

In order to cool the electric motor 19, the electrically assisted exhaust gas turbocharger 2 has a coolant channel 33, wherein the coolant channel 33 is designed to have coolant 34 flowing therethrough. In the present exemplified embodiment, the coolant 34 is compressed air downstream of the compressor wheel 13 in the fresh air-conducting section 7, which is extracted downstream of the compressor wheel 13 from the extraction point 29 and is fed to the compression wheel 13 upstream thereof.

The coolant channel 33, which is designed at least partially in the form of gaps 37 between components of the electrically assisted exhaust gas turbocharger 2, is designed to guide the coolant 34 from a side 35 of the electric motor 19 facing away from the compressor wheel 13 to a side 36 of the electric motor 19 facing the compressor wheel 13, wherein the guidance of the coolant 34 from one side 35 to the other side 36 is effected by the coolant channel 33 which is formed in this region in the form of the gap, in particular a movement gap between the rotor 22 and the stator 21, under forced guidance.

The forced guidance includes, at the very least or exclusively, a pressure difference between a charging pressure formed downstream of the compressor wheel 13 and an inlet pressure formed upstream of the compressor wheel 13 in the fresh air-conducting section 7. In order to achieve successful forced guidance, the charging pressure is greater than or at most equal to an inlet pressure.

Advantageously, the coolant 34 is then fed to the compressor wheel 13 directly at the rotor disk blade outlet edges 44 thereof, likewise a flow section of the coolant channel 33 could also be formed in the cover element 25, but this would give rise to machining costs which can be avoided by reason of the forced guidance.

For improved forced guidance, a sealing element 38 is arranged between the cover element 25 and the stator 21 and is arranged close to a stator opening 39 which accommodates the rotor 22. Therefore, it can be ensured that the coolant 34 is then fed at least predominantly to the compressor wheel 13.

FIG. 3, in which a perspective view of the bearing section 10 of the electrically assisted exhaust gas turbocharger 2 is illustrated, illustrates the coolant channel 33. In the present exemplified embodiment, a coolant channel inlet 40 of the coolant channel 33 is formed in the bearing section 10. The coolant channel inlet 40 is arranged at the top, wherein a tube or hose connection of the first cooling path 23 or the second cooling path 24 between the fresh air-conducting section 7 or starting from the fresh air-conducting section 7 and the bearing section 10 can be established in a simple manner.

Figure 4:
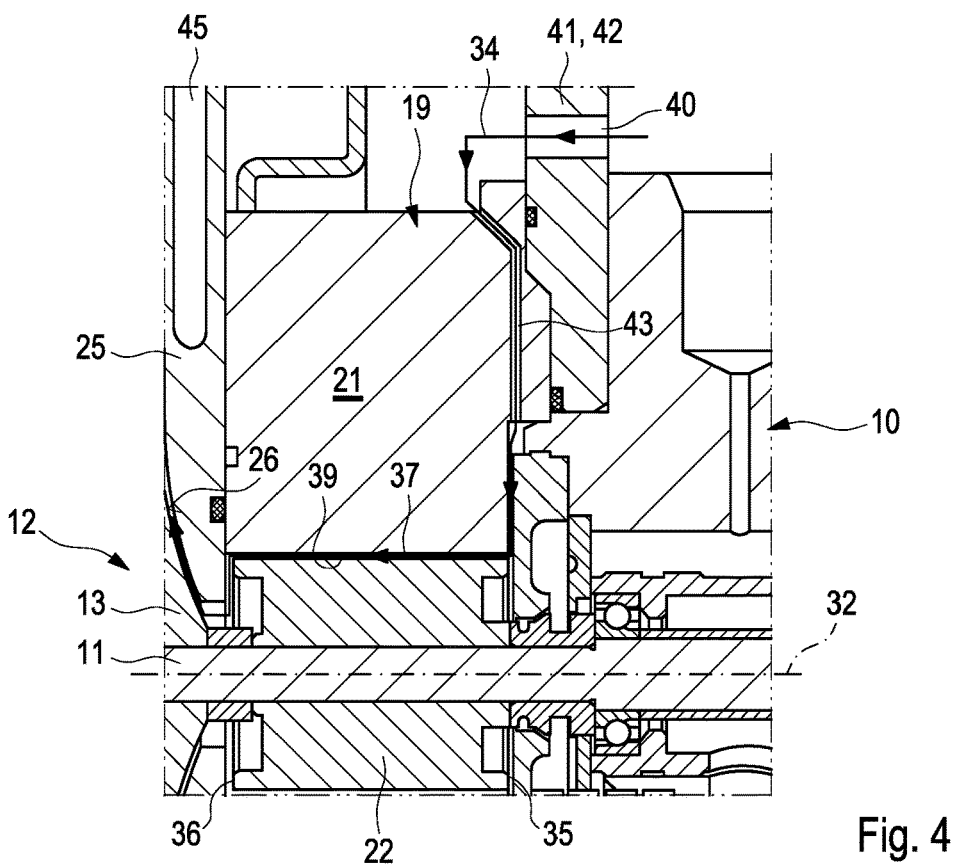
FIG. 4 shows a longitudinal sectional detail of the electrically assisted exhaust gas turbocharger in a second exemplified embodiment.
Figure 5:
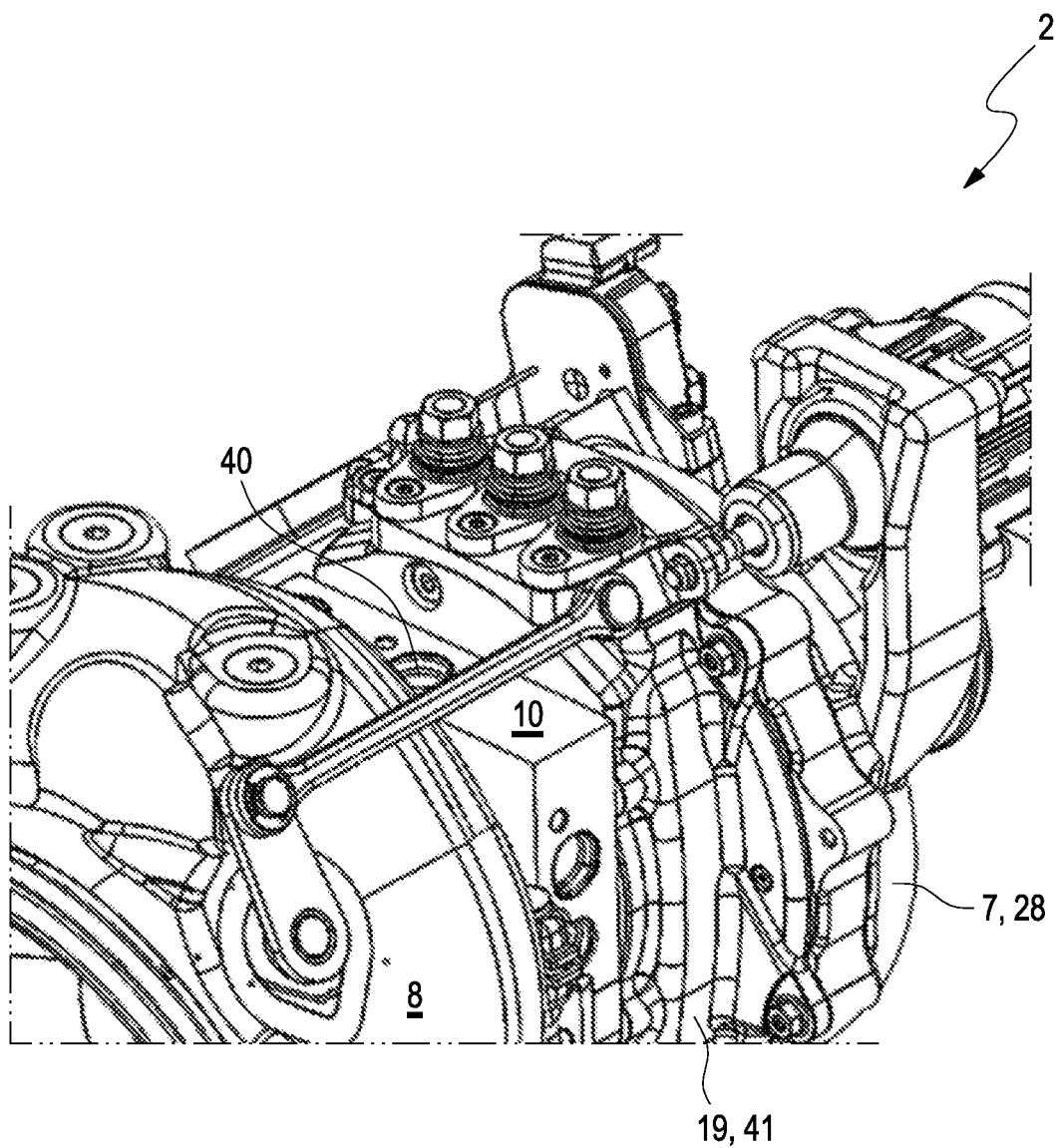
FIG. 5 shows a perspective view of a detail of the electrically assisted exhaust gas turbocharger according to FIG. 4.

In the second exemplified embodiment, the electrically assisted exhaust gas turbocharger 2 is designed as shown in FIGS. 4 and 5. The coolant channel 33 has the coolant channel inlet 40 on a housing wall 41 of a housing 42 which is designed to at least partially cover the electric motor 19 with respect to the environment 6. Likewise, the housing 42 can also be a housing of the electric motor 19.

Starting from the coolant channel inlet 40, the coolant 34 is forcibly guided along the stator 21 via at least one tube 43, wherein the tube 43 ends at the gap 37 formed between the rotor 22 and the stator 21 and the coolant is forcibly guided. The tube 43 can also be formed at least partially in the stator 21.

Advantageously, the cover element 25 is designed for water cooling, wherein the water cooling and the air cooling are completely separate. For this purpose, the cover element 25 has a water guide channel 45.

The invention claimed is:

1. An electrically assisted exhaust gas turbocharger, comprising:
   a fresh air-conducting section;
   an exhaust gas-conducting section;
   a bearing section;
   a rotating assembly comprising:
      a shaft that extends in an axial direction and that is rotatably mounted in the bearing section;
      a compressor wheel which is connected to the shaft for conjoint rotation therewith, wherein the compressor wheel is rotatably accommodated in the fresh air-conducting section; and
      a turbine wheel which is connected to the shaft for conjoint rotation therewith, wherein the turbine wheel is rotatably accommodated in the exhaust gas-conducting section;
   an electric motor having a rotor and a stator, wherein the rotor is arranged in operative connection with the shaft;
   a coolant channel configured to guide a coolant to flow therethrough, to cool the motor, wherein the coolant is compressed air that is extracted downstream of the compressor wheel and that is fed to at least one inlet of the coolant channel;
   a cover element including a liquid guiding channel configured to guide a liquid therethrough, wherein the cover element has a planar surface facing the stator of the motor in the axial direction; and
   a sealing element formed in the planar surface of the cover element, wherein both the sealing element and the cover element are located between the motor and the fresh air-conducting section in the axial direction.

2. The electrically assisted exhaust gas turbocharger according to claim 1, wherein the coolant channel is configured to guide the coolant to flow from a first side of the motor facing away from the compressor wheel, to a second side of the motor facing the compressor wheel.

3. The electrically assisted exhaust gas turbocharger according to claim 1, wherein the fresh air-conducting section is configured to guide the compressed air to flow therethrough.

4. The electrically assisted exhaust gas turbocharger according to claim 1, wherein the coolant channel is configured to guide the coolant to flow with forced guidance that is generated by a pressure difference between a charging pressure formed downstream of the compressor wheel and an inlet pressure formed upstream of the compressor wheel in the fresh air-conducting section.

5. The electrically assisted exhaust gas turbocharger according to claim 1, wherein the coolant channel is formed at least partially in the bearing section.

6. The electrically assisted exhaust gas turbocharger according to claim 1,
   wherein the bearing section is located between the fresh air-conducting section and the motor, and
   wherein the at least one inlet of the coolant channel includes a coolant channel inlet in the bearing section that is located downstream of the compressor wheel, in a flow direction of the coolant.

7. The electrically assisted exhaust gas turbocharger according to claim 1, wherein the coolant channel is formed at least partially in the stator.

8. The electrically assisted exhaust gas turbocharger according to claim 1, wherein the motor is arranged between the fresh air-conducting section and the bearing section.

9. The electrically assisted exhaust gas turbocharger according to claim 1, further comprising a housing that at least partially covers the motor, wherein the at least one inlet of the coolant channel includes a coolant channel inlet formed in the housing at a location that is upstream from the compressor wheel, in a flow direction of the coolant.

10. A drive unit comprising:
   an electrically assisted exhaust gas turbocharger including:
      a fresh air-conducting section;
      an exhaust gas-conducting section;
      a bearing section;
      a rotating assembly comprising:
         a shaft that extends in an axial direction and that is rotatably mounted in the bearing section;
         a compressor wheel which is connected to the shaft for conjoint rotation therewith, wherein the compressor wheel is rotatably accommodated in the fresh air-conducting section; and
         a turbine wheel which is connected to the shaft for conjoint rotation therewith, wherein the turbine wheel is rotatably accommodated in the exhaust gas-conducting section;
      an electric motor having a rotor and a stator, wherein the rotor is arranged in operative connection with the shaft;
      a coolant channel configured to guide a coolant to flow therethrough, to cool the motor, wherein the coolant is compressed air that is extracted downstream of the compressor wheel and that is fed to at least one inlet of the coolant channel; and a sealing element facing the stator of the motor in the axial direction, wherein the sealing element is located between the motor and the fresh air-conducting section in the axial direction;

an internal combustion engine having an intake line to be supplied with the coolant from the electrically assisted exhaust gas turbocharger;

a charging air cooler connected to the intake line of the internal combustion engine;

a first cooling path including a first extraction point of the coolant formed downstream of the compressor wheel and upstream of the charging air cooler; and a second cooling path including a second extraction point of the coolant formed downstream of the charging air cooler and upstream of the intake line of the internal combustion engine, wherein the first cooling path is fluidly coupled to the second cooling path at a coupling point.

* * * * *